United States Patent [19]

Tsuji et al.

[11] Patent Number: 5,627,250

[45] Date of Patent: May 6, 1997

[54] UNSATURATED NITRILE-CONJUGATED DIENE COPOLYMER, PROCESS FOR PRODUCING SAME AND RUBBER COMPOSITION

[75] Inventors: Suguru Tsuji, Tokyo; Yuichi Uchizono, Yokosuka; Misako Asada, Yokohama, all of Japan

[73] Assignee: Nippon Zion Co., Ltd., Tokyo, Japan

[21] Appl. No.: 406,903

[22] PCT Filed: Mar. 30, 1994

[86] PCT No.: PCT/JP94/00524

§ 371 Date: Mar. 29, 1995

§ 102(e) Date: Mar. 29, 1995

[87] PCT Pub. No.: WO94/22924

PCT Pub. Date: Oct. 13, 1994

[30] Foreign Application Priority Data

Mar. 30, 1993 [JP] Japan ................. 5-095664

[51] Int. Cl.⁶ .................. C08F 236/04; C08F 2/38
[52] U.S. Cl. .................. 526/338; 526/224; 526/292.8; 526/342; 526/917; 525/332.6; 264/328.2; 264/331.13; 428/36.8
[58] Field of Search .................. 526/224, 297, 526/299, 300, 338, 342, 292.8; 525/332.6; 264/328.2, 331.13; 428/35

[56] References Cited

U.S. PATENT DOCUMENTS

| 4,060,680 | 11/1977 | Hendy | 526/224 X |
| 4,082,818 | 4/1978 | Coffey et al. | 526/224 X |

FOREIGN PATENT DOCUMENTS

| 45-3102 | 2/1970 | Japan . | |
| 60-55532 | 12/1985 | Japan . | |
| 0625646 | 7/1949 | United Kingdom | 526/224 |
| 0625647 | 8/1949 | United Kingdom | 526/224 |
| 965175 | 7/1964 | United Kingdom . | |

*Primary Examiner*—Fred Teskin
*Attorney, Agent, or Firm*—Armstrong, Westerman, Hattori, McLeland & Naughton

[57] ABSTRACT

An unsaturated nitrile-conjugated diene copolymer having at least 0.03 mole, per 100 moles of the monomeric units constituting the molecule, of an alkylthio group having 12 to 16 carbon atoms, which include at least three tertiary carbon atoms, and having a sulfur atom which is directly bound to at least one of the tertiary carbon atoms; said copolymer having a Mooney viscosity of 15 to 65. This copolymer is produced by copolymerizing an unsaturated nitrile and a conjugated diene in the presence of a free-radical initiator by using as a molecular weight modifier an alkylthiol compound having the above-mentioned alkylthio group. The copolymer is used as a rubber composition having incorporated therein a sulfur-containing vulcanizer.

16 Claims, 1 Drawing Sheet

UNSATURATED NITRILE-CONJUGATED DIENE COPOLYMER, PROCESS FOR PRODUCING SAME AND RUBBER COMPOSITION

TECHNICAL FIELD

This invention relates to an unsaturated nitrile-conjugated diene copolymer, a process for producing the same, and a rubber composition comprising the same and a vulcanizer. More particularly, it relates to an unsaturated nitrile-conjugated diene copolymer suitable for injection molding, a process for producing the unsaturated nitrile-conjugated diene copolymer by using a specific thiol compound as a molecular weight modifier, and a rubber composition comprising the unsaturated nitrile-conjugated diene copolymer and a sulfur-containing vulcanizer.

BACKGROUND ART

In recent years, injection molding has been widely employed for molding an acrylonitrile-butadiene rubber (hereinafter referred to as "NBR") into articles in view of productivity and rationality, for which good oil resistance and heat resistance are required. Recently such articles broadly include, for example, rubber vibration insulators, electrical parts, automobile parts, industrial parts and footwear.

It is required for the injection molding of NBR that NBR has a good flowability and, when NBR is vulcanized at a high temperature for a short time, the vulcanization is effected at a high efficiency. Namely, a high-rate vulcanizability is required. In general, the higher the vulcanization temperature, the lower the degree of vulcanization of rubber. Thus injection molded articles have poorer tensile stress and impact resilience than those of compression molded articles (for example, Journal of the Society of Rubber Industry, Japan, vol. 59, No. 4, p 214–215, 1986).

To obtain a high rate of vulcanization in the injection molding of NBR, many methods have been proposed which include, for example, a method of introducing a functional group such as a carboxyl group or an amino group into the molecule of NBR, a method of incorporating a special vulcanization promotor, and a method of, when an emulsion polymerization is conducted for the production of NBR, using minimum amounts of an emulsifier and a coagulant so that minimum amounts of the emulsifier and the coagulant remain in the resulting NBR. These proposed methods have problems such that the enhancement of the rate of vulcanization is not sufficient and some other characteristics such as cold resistance and compression set are deteriorated.

Further, the contamination of a mold is conspicuous in the injection molding of NBR wherein vulcanization is carried out at a high temperature. Namely, when the molding of NBR is repeated, staining materials are gradually deposited on the mold with the result of contamination of NBR moldings and spoiling of the surface appearance. Therefore the mold must be cleaned at regular intervals. The cleaning is time-consuming and costly and leads to reduction in productivity.

To avoid the contamination of a mold, an attempt has been made wherein talc, sodium thiosulfate, carbon wax or silicone oil is incorporated in NBR. However, even when this attempt is made for injection molding of commercially available general-purpose NBR wherein vulcanization is carried out at a high temperature and a high rate, the contamination can be avoided only to a limited extent

DISCLOSURE OF INVENTION

An object of the present invention is to provide an unsaturated nitrile-conjugated diene copolymer which can be vulcanized at a high rate and is suitable for injection molding.

Another object of the present invention is to provide a process for producing the unsaturated nitrile-conjugated diene copolymer at a high efficiency in productivity.

Still another object of the present invention is to provide a vulcanizable rubber composition comprising the unsaturated nitrile-conjugated diene copolymer and a vulcanizer, which is suitable for a high rate of vulcanization.

In accordance with the present invention, there are provided:

(1) an unsaturated nitrile-conjugated diene copolymer having at least 0.03 mole, per 100 moles of the monomeric units constituting the molecule, of an alkylthio group having 12 to 16 carbon atoms, which include at least three tertiary carbon atoms, and having a sulfur atom which is directly bound to at least one of the tertiary carbon atoms; said copolymer having a Mooney viscosity of 15 to 65;

(2) a process for producing the above-mentioned unsaturated nitrile-conjugated diene copolymer characterized in that an unsaturated nitrile and a conjugated diene are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms; and, (3) a rubber composition comprising 100 parts by weight of the above-mentioned unsaturated nitrile-conjugated diene copolymer and 0.01 to 10 parts by weight of a sulfur-containing vulcanizer.

BEST MODE FOR CARRYING OUT THE INVENTION

The unsaturated nitrile-conjugated diene copolymer of the present invention has an alkylthio group having 12 to 16 carbon atoms, which include at least three tertiary carbon atoms, and a sulfur atom directly bound to at least one of the tertiary carbon atoms, and further has a Mooney viscosity of 15 to 65, preferably 20 to 60. If the Mooney viscosity is smaller than 15, when the copolymer is injection-molded, a salient amount of fins are undesirably produced and the resulting shaped article has a poor strength. If the Mooney viscosity exceeds 65, the viscosity is too large to subject to injection molding.

The content of bound unsaturated nitrile units in the copolymer is 10 to 60% by weight, preferably 20 to 50% by weight. As examples of the unsaturated nitrile, there can be mentioned acrylonitrile, methacrylonitrile and α-chloroacrylonitrile. As examples of the conjugated diene, there can be mentioned 1,3-butadiene, 2,3-dimethylbutadiene, isoprene and 1,3-pentadiene.

Provided that the intended effects of the present invention are not injured, a part of the unsaturated nitrile and a part of the conjugated diene can be substituted by other copolymerizable monomers. As the copolymerizable monomers, there can be mentioned, for example, vinyl monomers such as styrene, α-methylstyrene and vinylpyridine; non-conjugated diene monomers such as vinylnorbornene, dicyclopentadiene and 1,4-hexadiene; unsaturated carboxylic acids such as acrylic acid and methacrylic acid; unsaturated carboxylic acid ester monomers such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, cyclohexyl acrylate, cyclohexyl methacrylate, lauryl acrylate and lauryl methacrylate; polyethylene glycol acrylate, polyethylene glycol methacrylate, polypropylene glycol acrylate, polypropylene glycol methacrylate, epoxy acrylate, epoxy methacrylate, urethane acrylate and urethane methacrylate. These copolymerizable monomers are usually used in an amount of not larger than 10% by weight based on the total weight of the monomers.

Among the unsaturated nitrile-conjugated diene copolymer rubbers, acrylonitrile-butadiene copolymer rubbers (hereinafter referred to as "NBR") having a bound acrylonitrile content of 10 to 60% by weight, preferably 20 to 50% by weight, are preferable. Both commercially available extremely high-nitrile NBR and commercially available low-nitrile NBR can be used. An optimum bound acrylonitrile content is chosen depending upon the required performances.

As the alkylthio group possessed by the unsaturated nitrile-conjugated diene copolymer of the present invention, i.e., an alkyl group having 12 to 16 carbon atoms, which include at least three tertiary carbon atoms, and having a sulfur atom directly bound to at least one of the tertiary carbon atoms, there can be mentioned a 1,1-di(2,2-dimethylpropyl)-1-ethylthio group and a 1,1-di(2,2-dimethylpropyl)-1-(2,2,4,4-tetramethylpentyl)-1ethylthio group. Of these, a 1,1-di(2,2-dimethylpropyl)-1-ethylthio group is preferable. These alkylthio groups may be contained alone or in combination in the molecule.

The unsaturated nitrile-conjugated diene copolymer of the present invention contains the above-mentioned alkylthio group in an amount of at least 0.03 mole, preferably at least 0.07 mole, and more preferably at least 0.09 mole, per 100 moles of the monomer units constituting the molecule. If the amount of the alkylthio group is too small, when the copolymer is vulcanized at a high temperature for a short time e.g., at the step of injection molding, a high vulcanization efficiency cannot be obtained and thus the tensile stress and impact resilience cannot be improved. Namely the intended high rate of vulcanization cannot be effected. Further, as an increase in the amount of the alkylthio group, the scorch time ($T_5$) is markedly shortened and the contamination of a mold is mitigated, and thus, the productivity in injection molding is enhanced. Especially when the content of the alkylthio group is at least 0.09 mole, the vulcanization efficiency is markedly improved, and the maximum torque in a vulcanization curve as obtained by measurement using an oscillating disc rheometer is drastically increased.

The unsaturated nitrile-conjugated diene copolymer of the present invention is produced by a process wherein an unsaturated nitrile monomer and a conjugated diene monomer are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms.

The free radical initiator used is not particularly limited. As typical examples of the free radical initiator, there can be mentioned organic peroxides, redox polymerization initiators, azo compounds and persulfates. These polymerization initiators are usually used in an amount of 0.005 to 3 parts by weight per 100 parts by weight of the monomers. The polymerization temperature is preferably in the range of 0° to 100° C.

As specific examples of the alkylthiol compound which is used as a molecular weight mofifier for the production of the unsaturated nitrile-conjugated diene copolymer of the present invention, there can be mentioned 2,2',4,6,6'-pentamethylheptane-4-thiol and 2,2',4,6,6',8,8'-heptamethylnonane-4-thiol. Of these, 2,2',4,6,6'-pentamethylheptane-4-thiol is preferable. An saturated nitrile-conjugated diene copolymer produced by using this thiol compound exhibits excellent efficiency in high-rate vulcanization.

The alkylthiol compound which is used as a molecular weight modifier for the production of the unsaturated nitrile-conjugated diene copolymer of the present invention can be used either alone or in combination. If desired, this thiol compound can be used in combination with another compound which is conventionally used as a molecular weight modifier in radical polymerization. In this case, the alkylthiol compound should be used in an amount of at least 50% by weight, preferably at least 80% by weight, and more preferably at least 95% by weight, based on the total weight of the molecular weight modifiers.

As the compound used as a molecular weight modifier in combination with the above-mentioned alkylthiol compound in radical polymerization, there can be mentioned, for example, alkylthiol compounds such as 2,4,4-trimethylpentane-2-thiol, dodecane-12-thiol, 2,2,6,6-tetramethylheptane-4-methanethiol and 2,4,6-trimethylnonane-4-thiol; xanthogendisulfides such as dimethyl xanthogendisulfides, diethyl xanthogendisulfide and diisopropyl xanthogendisulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and acrolein, methacrolein, allyl alcohol, 2-ethylhexyl thioglycolate, terpinolene, α-terpinene, γ-terpinene, dipentene, α-methylstyrene dimer (which preferably contains at least 50% by weight of 2,4-diphenyl-4-methyl-pentene), 2,5-dihydrofuran, 3,6-dihydro-2H-pin, phthalan, 1,2-butadiene and 1,4-hexadiene.

The amount of the molecular weight modifier used for radical polymerization is usually 0.05 to 3 parts by weight, preferably 0.1 to 1 part by weight, based on 100 parts by weight of the monomer mixture for copolymerization. This amount is advantageous for desirably controlling the molecular weight of the copolymer.

By using the above-specified alkylthiol compound for the production of the unsaturated nitrile-conjugated diene copolymer of the present invention, the conversion in radical polymerization can be enhanced to at least 75%, preferably at least 80%. Thus the nitrile rubber can be produced at a high productivity.

In a radical polymerization for the production of an unsaturated nitrile-conjugated diene copolymer, a branchforming reaction or gelation generally becomes marked with an increase of the polymerization conversion. Where the resulting nitrile rubber is vulcanized with a vulcanizer, a high efficiency in vulcanization cannot be obtained and the vulcanizate has poor physical properties such as tensile stress and impact resilience. t-Dodecyl mercaptan which is conventionally used as a molecular weight modifier in a radical polymerization for the preparation of nitrile rubbers is a mixture of alkylthiol compound isomers having 9 to 16 carbon atoms. Where this mixture is used as a molecular weight modifier, the resulting nitrile rubbers are difficult to vulcanize at a high rate when they are subjected to a high-temperature and short-period vulacanization, for example, when injection-molded.

In contrast, according to a process for the production of the unsaturated nitrile-conjugated diene copolymer of the present invention, even when the polymerization conversion is high, e.g., 80% or higher, the resulting nitrile rubber can be vulcanized at a high rate, and thus, the maximum torque in a vulcanization curve as obtained by measurement using an oscillating disc rheometer is high.

The procedure by which the radical polymerization is effected is not particularly limited. According to the need, an appropriate procedure is chosen from bulk polymerization, solution polymerization, suspension polymerization or emulsion polymerization. Of these, emulsion polymerization is preferable.

Where the unsaturated nitrile-conjugated diene copolymer of the present invention is produced by an emulsion polymerization procedure, if a carboxylic acid type emulsifier is used, a problem of mold contamination can be more efficiently avoided at a high-temperature short-time vulcanization such as injection molding.

The carboxylic acid type emulsifier used includes, for example, fatty acid soap and rosin soap. As specific examples of the carboxylic acid type emulsifier, there can be mentioned fatty acid soap such as a sodium salt or a potassium salt of long-chain aliphatic carboxylic acids having 12 to 18 carbon atoms, for example, lauric acid, myristic acid, palmitic acid, stearic acid, oleic acid and mixtures thereof; and rosin soap such as a sodium salt or a potassium salt of a disproportionated or hydrogenated product of natural rosin such as gum rosin, wood rosin or tall oil rosin. The natural rosin contains as main ingredients abietic acid, levopimaric acid, palustric acid, dehydroabietic acid, tetrahydroabietic acid and neoabietic acid. The amount of the emulsifier used is usually in the range of 0.05 to 10 parts by weight, preferably 0.5 to 3 parts by weight per 100 parts by weight of the monomers.

The emulsion polymerization for the unsaturated nitrile-conjugated diene copolymer of the present invention can be carried out by a conventional procedure, and when the predetermined conversion is reached, polymerization is terminated by adding a short-stopper such as hydroxylamine or sodium carbamate. Unreacted monomers are removed, for example, by heating or steam distillation, and then, a coagulant is added whereby the copolymer is coagulated and then recovered. The coagulant used is chosen from those which are conventionally used in an emulsion polymerization, and which include an inorganic coagulant, for example, potassium chloride or aluminum sulfate, a high-polymer coagulant or a heat-sensitive coagulant. The recovered copolymer is washed with water, and dried to give the intended copolymer.

By the incorporation of a sulfur-containing vulcanizer in the unsaturated nitrile-conjugated diene copolymer, a rubber composition exhibiting an excellent high-rate vulcanizability can be obtained. As examples of the sulfur-containing vulcanizer used, there can be mentioned sulfur such as powdered sulfur, flower of sulfur, precipitated sulfur, colloidal sulfur, surface-treated sulfur and insoluble sulfur, and sulfur-containing compounds such as sulfur chloride, sulfur dichloride, morpholine, disulfide, an alkylphenol disulfide, N,N'-dithio-bis-(hexahydro-2H-azepinon-2), sulfur-containing polysulfide and high-molecular weight polysulfide. Further, sulfur-containing vulcanization promoters such as tetramethylthiuram disulfide, selenium dimethyl dithiocarbamate and 2-(4'-morphorinodithio)benzothiazole are included.

In combination with the sulfur-containing vulcanizer, a vulcanization promoter can be used which includes, for example, zinc white or stearic acid; or a guanidine, aldehyde-amine, aldehyde-ammonia, thiazole, sulfenamide, thiourea or xanthate promoter.

The amount of the sulfur-containing vulcanizer is not particularly limited, but is usually in the range of 0.10 to 10 parts by weight, preferably 0.1 to 5 parts by weight, per 100 parts by weight of the unsaturated nitrile-conjugated diene copolymer.

If a rubber composition does not contain a sulfur-containing vulcanizer as a vulcanizer, the intended high-rate vulcanization cannot be obtained at a high-temperature short-time vulcanization. However, a vulcanizer other than the sulfur-containing vulcanizer, such as an organic peroxide vulcanizer, can be used in combination with the sulfur-containing vulcanizer.

As the organic peroxide vulcanizer used, there can be mentioned, for example, tert-butyl hydroperoxide, cumene hydroperoxide, di-tert-butyl peroxide, tert-butylcumyl peroxide, 2,5-dimethyl-tert-butyl peroxyhexane, 2,5-dimethyl-tert-butyl peroxyhexyne, 1,3-bis(tert-butyl peroxyisopropyl)benzene, p-chlorobenzoyl peroxide, tert-butyl peroxybenzoate, tert-butyl peroxyisopropylcarbonate and tert-butyl benzoate.

As other vulcanizers which are also used in combination with the sulfur-containing vulcanizer, there can be mentioned polyfunctional compounds such as trimethylolpropane trimethacrylate, divinylbenzene, ethylene dimethacrylate and triallyl isocyanurate. Further, there can be mentioned a metallic soap/sulfuric vulcanizer, a triazine/dithiocarbamate vulcanizer, a polycarboxylic acid/onium salt vulcanizer, a polyamine vulcanizer such as hexamethylenediamine, triethylenetetramine, hexamethylenediamine carbamate, ethylenediamine carbamate or triethylenediamine, and an ammonium benzoate vulcanizer.

In the rubber composition of the present invention, auxiliaries which are conventionally used in rubber compositions can be incorporated according to the need. Such auxiliaries include, for example, reinforcing materials such as various types of carbon black, silica and talc, fillers such as calcium carbonate and clay, processing aids, processing oils including plasticizers, antioxidants, and antiozonants.

If desired, other rubbers can be incorporated in combination with the unsaturated nitrile-conjugated diene copolymer in the rubber composition of the present invention, which rubbers include, for example, an acrylic rubber, a styrene-butadiene copolymer rubber, an ethylene-propylene-diene terpolymer rubber (EPDM), natural rubber and a polyisoprene rubber.

The procedure by which the rubber composition of the present invention is prepared is not particularly limited, but the rubber composition is usually prepared by mixing and kneading together the rubber material, a vulcanizing system and other auxiliaries by using a conventional mixer such as a roll mixer or a Banbury mixer.

The present invention will now be described specifically by the following examples. Parts and % in the following examples, comparative examples and reference examples are by weight unless otherwise specified.

Characteristics of rubber compositions and raw materials were determined as follows.

(1) High-rate vulcanizability

Using 10 grams of an unvulcanized rubber composition prepared according to the recipe shown in Table 1 or Table 2, the scorch time ($T_5$ in minute) and maximum torque ($V_{max}$ in kgf/cm) at a temperature of 160° C. were determined by an oscillating disc rheometer according to the Society of Rubber Industrial Japan Standard SRIS 3102. The smaller the $T_5$ value, the higher the rate of vulcanization. The larger the $V_{max}$ value, the larger the efficiency in crosslinking.

(2) Properties of Vulcanizate

According to Japanese Industrial Standard JIS K6301, an unvulcanized rubber composition prepared according to the recipe shown in Table 1 or Table 2 was vulcanized at a temperature of 160° C. for 20 minutes to give a sheet having a thickness of 2 mm. A #3 dumbbell specimen was cut out from the sheet.

Tensile strength (kgf/cm$^2$), tensile stress at 100% elongation (kgf/cm$^2$) and elongation (%) were measured on the dumbbell specimen. Hardness was measured by using a JIS spring-type A hardness tester. Impact resilience (%) was measured according to JIS K6301. Oil resistance was evaluated by the volume change (%) as measured after immersion of the rubber specimen in a #3 lubricating oil having a kinetic viscosity of 31.9 to 34.1, an aniline point of 69.5°+1° C. and a flash point of 162.7° C.

TABLE 1

| Components | Amount (parts by weight) |
| --- | --- |
| Copolymer | 100 |
| Zinc oxide | 5 |
| Stearic acid | 1 |
| Sulfur (325 mesh) | 0.5 |
| SRF carbon black | 60 |
| Dioctyl phthalate | 5 |
| Tetramethylthiuram disulfide | 1.5 |
| N-cyclohexyl-2-benzothiazyl-sulfenamide | 1.5 |

TABLE 2

| Components | Amount (parts by weight) |
| --- | --- |
| Copolymer | 100 |
| Zinc oxide | 5 |
| Stearic acid | 1 |
| Sulfur (325 mesh) | 1.5 |
| Hydrous silicic acid *1 | 30 |
| Dibenzothiazyl disulfide | 5 |
| Diphenylguanidine | 0.5 |

*1 Carplex #1120 supplied by Shionogi & Co.

(3) Bound nitrile content

According to JIS K6384 the content of nitrogen in the copolymer was measured by the Kjeldahl method, and the bound nitrile content (%) was determined by calculation.

(4) Mooney viscosity

Using about 40 grams of the copolymer, the Mooney viscosity was measured at a temperature of 100° C. according to JIS K6383.

(5) Molecular weight and molecular weight distribution

Number average molecular weight (Mn) and weight average molecular weight (Mw) in terms of those of standard polystyrene were measured. Molecular weight distribution was expressed by the Mw/Mn ratio calculated from the molecular weight.

(6) Solution viscosity

The copolymer was dissolved in methyl ethyl ketone to prepare a solution of a 10% concentration, and the viscosity (centi-poise) thereof was measured at room temperature.

(7) Concentration of a 1,1-di(2,2-dimethylpropyl)-1-ethylthio group in copolymer The copolymer was dissolved in benzene and then coagulated in methyl alcohol. This step of dissolution and coagulation was repeated three times, and then the copolymer was purified. The purified copolymer was subjected to the measurement by NMR as follows.

By measurement using $^1$H-NMR (400 MHz), a peak due to a proton of the terminal methyl group in the 1,1-di(2,2-dimethylpropyl)-1-ethylthio group was detected in the vicinity of 1.05 ppm. By measurement using $^{13}$C-NMR (100 MHz), a peak due to the carbon atom of the methylene group in said ethylthio group was detected in the vicinity of 54.6 ppm.

The concentration (% by mole) of said ethylthio group in the copolymer was determined by calculation from the ratio (A/B) of (A) an integrated value of the peak due to the terminal methyl group as detected by the $^1$H-NMR measurement to (B) an integrated value of a peak detected in the vicinity of 4.8 to 5.8 ppm due to a proton bound to an unsaturation of butadiene.

(8) Contamination of mold

An unvulcanized rubber composition was prepared according the recipe shown in Table 1 or Table 2, and the rubber composition was filled in a hole with a diameter of 12 mm of a metal plate having a thickness of 2 mm. The rubber composition-filled metal plate was sandwiched between two mild steel sheets (JIS G3141) each having a thickness of 1 mm. Then the rubber composition in the sandwiched metal plate was vulcanized at a temperature of 220° C. and a pressure of 20 kg/cm$^2$ for 2 minutes. The vulcanized rubber was removed and then an unvulcanized rubber composition was again filled in the hole of the metal plate, followed by vulcanization. This operation of removal of a vulcanized rubber, and filling and vulcanization of an unvulcanized rubber was repeated 50 times, and the contamination of the contact surface of each mild steel sheet was evaluated.

The degree of contamination was expressed by five ratings. Rating 1 means that there was no contamination on the mild steel sheets, and rating 5 means that the entire contact surface of each mild steel sheet was contaminated to the greatest extent.

EXAMPLE 1

A reactor having an inner volume of 10 liters was charged with 100 parts of water, 67 parts of butadiene and 32 parts of acrylonitrile, and further, 2 parts of potassium oleate as an emulsifier, 0.1 part of potassium phosphate as a stabilizer and 0.5 part of 2,2',4,6,6'-pentamethylheptane-4-thiol were added. In the presence of 0.35 part of potassium persulfate as a polymerization initiator, further added, butadiene and acrylonitrile were copolymerized at 30° C. by an emulsion polymerization procedure.

When the conversion reached 90%, 0.2 part of hydroxylamine sulfate per 100 parts of the monomers was added to terminate polymerization. Then the polymerization mixture was heated and subjected to a steam distillation at about 70° C. under a reduced pressure to recover residual monomers. As an aging stabilizer 2 parts of an alkylated phenol was added, and the resulting polymer latex was incorporated in an aqueous calcium chloride solution whereby the polymer was coagulated. The thus-produced crumb was taken out, and washed with water and then dried at 50° C. under a reduced pressure to obtain copolymer I. The content of bound butadiene in copolymer I, the content of bound nitrile therein and the Mooney viscosity of copolymer I are shown in Table 3.

According to the recipe shown in Table 1 copolymer I was kneaded with the other components by a Banbury mixer to obtain a rubber composition. The rubber composition was subjected to a press vulcanization at 160° C. for 20 minutes, and the physical properties of the vulcanized product were evaluated. The results are shown in Table 4.

EXAMPLE 2

Copolymerization of butadiene and acrylonitrile was carried out by the same procedure as that described in Example 1 except that the amounts of butadiene and acrylonitrile and the kind of emulsifier were varied as shown in Table 3, to obtain copolymer II. The results of polymerization are shown in Table 3. A vulcanized product was made from copolymer II and the physical properties of the product were evaluated by the same procedure as that in Example 1. The results are shown in Table 4.

COMPARATIVE EXAMPLE 1

Copolymerization of butadiene and acrylonitrile was carried out by the same procedure as that described in Example 1 except that the molecular weight modifier used was substituted by commercially available tert-dodecyl mercaptan (supplied by Phillips Petroleum Co.) to obtain copolymer III. The results of polymerization are shown in Table 3. A vulcanized product was made from copolymer III and the physical properties of the product were evaluated by the same procedure as that in Example 1. The results are shown in Table 4.

EXAMPLE 3

According to the recipe shown in Table 2, copolymer I prepared in Example 1 was kneaded with the other components by a Banbury mixer to obtain a rubber composition. The rubber composition was subjected to a press vulcanization at 160° C. for 20 minutes, and the physical properties of the vulcanized product were evaluated. The results are shown in Table 4.

COMPARATIVE EXAMPLE 2

According to the recipe shown in Table 2, copolymer III prepared in Comparative Example 1 was kneaded to obtain a rubber composition, and the rubber composition was vulcanized, by the same procedure as that in Example 3. The physical properties of the vulcanized product were evaluated. The results are shown in Table 5.

EXAMPLE 4

Copolymerization of butadiene and acrylonitrile was carried out by the same procedure as that described in Example 1 except that the amounts of butadiene and acrylonitrile and the kind of emulsifier were varied as shown in Table 3, to obtain copolymer IV. The results of polymerization are shown in Table 3. A vulcanized product was made from copolymer IV and the physical properties of the product were evaluated by the same procedure as that in Example 1. The results are shown in Table 4.

EXAMPLE 5

Copolymerization of butadiene and acrylonitrile was carried out by the same procedure as that described in Example 1 except that the molecular weight modifier used was substituted by a mixture of 2,2',4,6,6'-pentamethylheptane-4-thiol and commercially available tert-dodecyl mercaptan to obtain copolymer V. A vulcanized product was made from copolymer V and the physical properties of the product were evaluated by the same procedure as that in Example 1. The results are shown in Table 5.

COMPARATIVE EXAMPLES 3, 4

Copolymerization of butadiene and acrylonitrile was carried out by the same procedure as that described in Example 1 except that the molecular weight modifier used was substituted by n-octyl mercaptan (Comparative Example 3) and n-dodecyl mercaptan (Comparative Example 4) to obtain copolymer VI and copolymer VII, respectively. Vulcanized products were made from copolymer VI and copolymer VII, and the physical properties of the products were evaluated by the same procedure as that in Example 1. The results are shown in Table 5.

EXAMPLE 6

A vulcanized product was made from a 50/50 blend of copolymer I and copolymer III, and the physical properties of the products were evaluated by the same procedure as that in Example 1. The results are shown in Table 5.

As seen from Tables 4 and 5, a rubber composition comprising the unsaturated nitrile-conjugated diene copolymer of the present invention and a sulfur-containing vulcanizer exhibits a short scorch time ($T_5$), as measured by using an oscillating disc rheometer, and a high maximum torque ($V_{max}$), and thus, has an excellent high-rate vulcanizability. Therefore, the vulcanized product thereof exhibits a high tensile stress at 100% elongation and a high impact resilience. Obviously, the efficiency in crosslinking is high. Further, the rubber composition exhibits a reduced contamination of a mold. The reduced contamination of a mold is prominent especially when the emulsion polymerization is carried out by using a carboxylic acid emulsifier.

In contrast, when the emulsion polymerization is carried out by using tert-dodecyl mercaptan which is a molecular weight modifier generally used in radical polymerization, the high-rate vulcanizability is poor and the contamination of a mold is very unsatisfactory.

TABLE 3

| Copolymer | I | II | III | IV | V | VI | VII |
|---|---|---|---|---|---|---|---|
| Amounts of charged monomers | | | | | | | |
| Butadiene (%) | 67 | 72 | 67 | 72 | 67 | 67 | 67 |
| Acrylonitrile (%) | 33 | 28 | 33 | 28 | 33 | 33 | 33 |
| Emulsifier | | | | | | | |
| Potassium oleate | 2 | — | 2 | — | 2 | 2 | 2 |
| Disproportioned potassium rosinate | — | 2 | — | — | — | — | — |
| Sodium dodecyl-benzenesulfonate | — | — | — | 2 | — | — | — |
| Molecular weight modifier | | | | | | | |
| 2,2',4,6,6-Penta-methylheptane-4-thiol | 0.50 | 0.50 | — | 0.55 | 0.23 | — | — |
| t-Dodecyl mercaptan | — | — | 0.50 | — | 0.23 | — | — |
| n-Octyl mercaptan | — | — | — | — | — | 0.6 | 1.0 |
| n-Dodecyl mercaptan | — | — | — | — | — | — | — |
| Coagulant | $CaCl_2$ | $Al_2(SO_4)_3$ | $CaCl_2$ | $Al_2(SO_4)_3$ | $CaCl_2$ | $CaCl_2$ | $CaCl_2$ |
| Amounts of bound monomers in copolymer | | | | | | | |
| Bound butadiene (%) | 66 | 71 | 66 | 71 | 66 | 66 | 66 |
| Bound nitrile (%) | 34 | 29 | 34 | 29 | 34 | 34 | 34 |
| Money viscosity | 57 | 50 | 55 | 48 | 56 | 52 | 55 |

TABLE 4

| Example No. | Ex 1 | Ex 2 | Ex 3 | Ex 4 | Co Ex 1 |
|---|---|---|---|---|---|
| Copolymer No. | I | II | I | IV | III |
| Scorch time $T_5$ (min) | 3.0 | 3.0 | 3.1 | 3.2 | 4.0 |
| Maximum torque $V_{max}$ (kgf/cm$^2$) | 58 | 55 | 60 | 53 | 48 |
| Tensile strength (kgf/cm$^2$) | 160 | 163 | 150 | 164 | 162 |
| Tensile stress at 100% elongation (kgf/cm$^2$) | 33 | 34 | 19 | 34 | 30 |
| Elongation (%) | 450 | 440 | 570 | 440 | 420 |
| Hardness | 71 | 70 | 66 | 69 | 67 |
| Impact resilience (%) | 47 | 55 | 42 | 55 | 44 |
| Volume change (%) | 14.5 | 24.0 | — | 23.5 | 17.1 |
| Contamination of mold (rating) | 1 | 2 | 1 | 3 | 5 |

TABLE 5

| Example No. | Co Ex 2 | Ex 5 | Co Ex 3 | Co Ex 4 | Ex 6 |
|---|---|---|---|---|---|
| Copolymer No. | III | V | VI | VII | I/III |
| Scorch time $T_5$ (min) | 3.6 | 3.3 | 4.1 | 4.0 | 3.4 |
| Maximum torque $V_{max}$ (kgf/cm$^2$) | 45 | 55 | 47 | 46 | 56 |
| Tensile strength (kgf/cm$^2$) | 140 | 160 | 161 | 163 | 161 |
| Tensile stress at 100% elongation (kgf/cm$^2$) | 15 | 32 | 30 | 30 | 32 |
| Elongation (%) | 600 | 440 | 420 | 430 | 430 |
| Hardness | 63 | 70 | 66 | 65 | 70 |
| Impact resilience (%) | 39 | 46 | 44 | 44 | 46 |
| Volume change (%) | — | 15.0 | 17.0 | 17.3 | 15.2 |
| Contamination of mold (rating) | 4 | 1 | 4 | 4 | 2 |

EXAMPLES 7–11

Copolymerization of butadiene and acrylonitrile was carried out by the same emulsion polymerization procedure as that described in Example 1 wherein 2,2',4,6,6'-pentamethylheptane-4-thiol was used as a molecular weight modifier and the monomer charge was according to the recipe shown in Table 6, whereby a copolymer was obtained. A vulcanized product was made from the copolymer according to the recipe shown in Table 1 and the physical properties of the product were evaluated by the same procedure as that in Example 1. The results are shown in Table 6.

Figure 1:
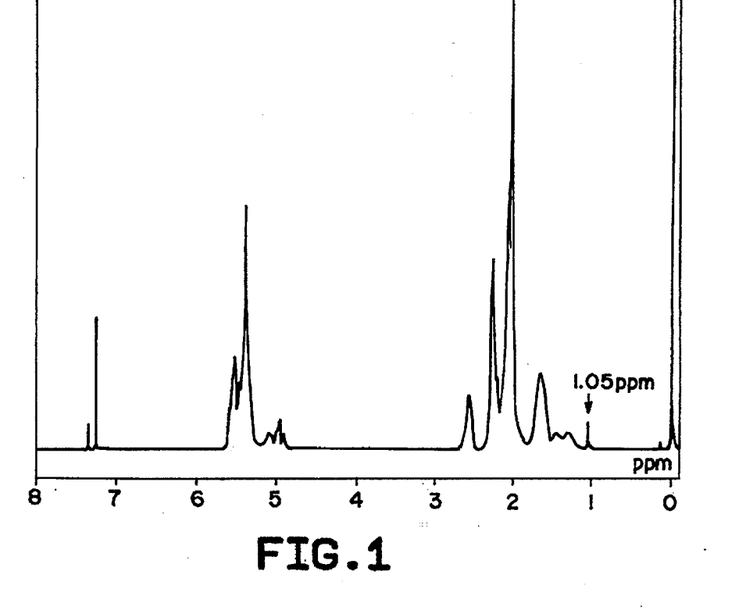
FIG. 1 is a chart of $^1$H-NMR determination of an unsaturated nitrile-conjugated diene copolymer of the present invention prepared in Example 6, hereinafter described.
Figure 2:
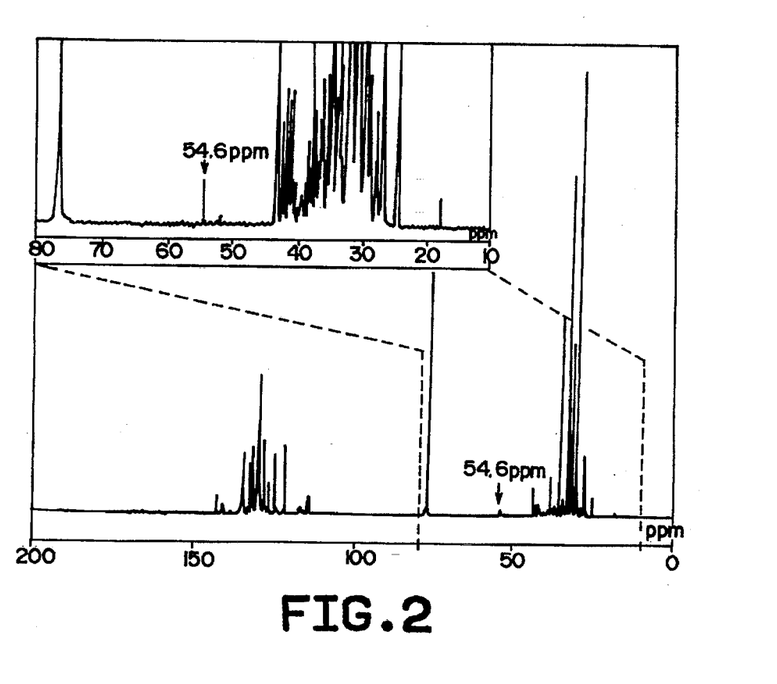
FIG. 2 is a chart of $^{13}$C-NMR determination of the same unsaturated nitrile-conjugated diene copolymer as mentioned above.

A chart of $^1$H-NMR determination of the copolymer obtained in Example 8 is shown in FIG. 1, and a chart of $^{13}$C-NMR determination of the same copolymer is shown in FIG. 2.

COMPARATIVE EXAMPLES 5–7

Copolymerization of butadiene and acrylonitrile was carried out by the same procedure as that described in Example 1 except that the molecular weight modifier used was substituted by commercially available tert-dodecyl mercaptan (supplied by Phillips Petroleum Co.) and the monomer charge was in accordance with the recipe shown in Table 6 to obtain a copolymer. A vulcanized product was made from the copolymer and the physical properties of the product were evaluated by the same procedure as that in Example 1. The results are shown in Table 6. The NMR determination revealed that 1,1-di(2,2-dimethylpropylene)-1-ethylthio group was not present.

As seen from the data in Table 6, the unsaturated nitrile-conjugated diene copolymer of the present invention exhibits a short scorch time (T5), a large maximum torque ($V_{max}$) and a high tensile stress at 100% elongation, and thus, it has an excellent high-rate vulcanizability. This is in striking contrast to a conventional copolymer which is made by an emulsion polymerization using commercially available tert-dodecyl mercaptan as a molecular weight modifier. In the case of the conventional copolymer, when the conversion exceeds 80%, branching occurs, and thus, the copolymer tends to have a low solution viscosity and the vulcanization product has poor physical properties.

TABLE 6

|  | Example | | | | | Comparative Example | | |
|---|---|---|---|---|---|---|---|---|
|  | 7 | 8 | 9 | 10 | 11 | 5 | 6 | 7 |
| Charged monomer | | | | | | | | |
| Butadiene (%) | 69 | 73 | 70 | 70 | 66 | 69 | 69 | 68 |
| Acrylonitrile | 31 | 27 | 30 | 30 | 32 | 31 | 31 | 32 |
| Molecular weight modifier | | | | | | | | |
| PMPT *1 | 0.44 | 0.45 | 0.45 | 0.45 | 0.45 | — | — | — |
| t-Dodecyl mercaptan | — | — | — | — | — | 0.48 | 0.48 | 0.48 |
| Results of polymerization | | | | | | | | |
| Polymerization time (h) | 11.5 | 11 | 13.2 | 13.2 | 17.2 | 12.5 | 12.3 | 17.2 |
| Conversion (%) | 80 | 85 | 85 | 85 | 90 | 80 | 65 | 90 |
| Mooney viscosity | 30 | 28 | 31 | 35 | 51 | 30 | 32 | 52 |
| Mn (×10,000) | 9.5 | 7.0 | 7.2 | 7.2 | 11.4 | 9.1 | 9.0 | 11.6 |
| Mw (×10,000) | 21.4 | 24.2 | 26.3 | 26.4 | 33.9 | 20.8 | 21.0 | 31.3 |
| Mw/Mn | 2.3 | 3.4 | 3.6 | 3.7 | 2.9 | 2.3 | 2.3 | 2.7 |
| Amount of bound butadiene (%) | 67 | 72 | 69 | 69 | 67 | 67 | 68 | 67 |
| Amount of bound nitrile (%) | 33 | 28 | 31 | 31 | 33 | 33 | 32 | 33 |
| Solution viscosity (cps) | 60 | 59 | 60 | 60 | 12.0 | 54 | 50 | 100 |
| Concentration of ethylthio group *2 (mol %) | 0.09 | 0.11 | 0.10 | 0.10 | 0.09 | — | — | — |
| Vulcanizability | | | | | | | | |
| $T_5$ (min) | 2.3 | 2.3 | 2.3 | 2.3 | 2.1 | 3.0 | 3.0 | 2.8 |
| $V_{max}$ (kgf.cm) | 60.0 | 61.0 | 62.0 | 62.5 | 64.3 | 52.0 | 53.0 | 46.0 |
| Properties of vulcanizate | | | | | | | | |
| Tensile strength (kgf/cm$^2$) | 141 | 157 | 150 | 163 | 147 | 137 | 138 | 150 |
| Elongation (%) | 380 | 430 | 390 | 430 | 330 | 400 | 410 | 380 |
| 100% Tensile strength (kgf/cm$^2$) | 33 | 31 | 31 | 31 | 35 | 29 | 28 | 30 |
| Hardness | 66 | 65 | 64 | 65 | 66 | 65 | 65 | 65 |

*1 PMPT: 2,2',4,6,6'-pentamethylpentane-4-thiol
*2 Concentration of 1,1-di(2,2-dimethylpropyl)-1-ethylthio group in copolymer (mol %)

The unsaturated nitrile-conjugated diene copolymer of the present invention containing at least 0.03 mole, preferably at least 0.07 mole, of 1,1-di(2,2-dimethylpropyl)-1-ethylthio group in the molecule has excellent high-rate vulcanizability and the vulcanized product has good physical properties, although the conversion exceeds 80% in the course of copolymerization; and further, the copolymer can be made in a high productivity

INDUSTRIAL APPLICABILITY

In accordance with the present invention, there is provided an unsaturated nitrile-conjugated diene copolymer which exhibits excellent high-rate vulcanizability when vulcanized at a high temperature for a short time, and in which the problem of mold contamination is substantially solved. Since this copolymer has excellent high-rate vulcanizability, the copolymer is suitable especially for injection molding, and the molding of a rubber article can be effected in an enhanced productivity and with saved labor.

In the production of the unsaturated nitrile-conjugated diene copolymer of the present invention, a high conversion can be employed, and thus, the productivity in the manufacture thereof is greatly enhanced.

The rubber composition prepared from the unsaturated nitrile-conjugated diene copolymer of the present invention is suitable for an O-ring and other sealing materials, and widely used for various rubber articles such as belts, hoses and rolls.

We claim:
1. An unsaturated nitrile-conjugated diene copolymer having at least 0.03 mole, per 100 moles of the monomeric units constituting the molecule, of an alkylthio group having 12 to 16 carbon atoms, which include at least three tertiary carbon atoms, and having a sulfur atom which is directly bound to at least one of the tertiary carbon atoms; said copolymer having a Mooney viscosity of 15 to 65.

2. An unsaturated nitrile-conjugated diene copolymer as claimed in claim 1, which has at least 0.07 mole, per 100 moles of the monomeric units constituting the molecule, of said alkylthio group.

3. An unsaturated nitrile-conjugated diene copolymer as claimed in claim 1, wherein said alkylthio group is at least one member selected from the group consisting of a 1,1-di(2,2-dimethylpropyl)-1-ethylthio group and a 1-(2,2-dimethylpropyl)-1-(2,2,4,4-tetramethylpentyl)-1-ethylthio group.

4. An unsaturated nitrile-conjugated diene copolymer as claimed in claim 1, wherein said alkylthio group is a 1,1-di(2,2-dimethylpropyl)-1-ethylthio group.

5. An unsaturated nitrile-conjugated diene copolymer as claimed in claim 1, which is comprised of 10 to 60% by weight of acrylonitrile units and 90 to 40% by weight of butadiene units, and has a Mooney viscosity of 20 to 60.

6. A process for producing an unsaturated nitrile-conjugated diene copolymer, comprising the step of copolymerizing an unsaturated nitrile and a conjugated diene are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms.

7. A process for producing an unsaturated nitrile-conjugated diene copolymer as claimed in claim 6, wherein said alkylthiol compound is selected from the group consisting of 2,2',4,6,6'-pentamethylheptane-4-thiol and 2,2',4,6,6',8,8'-heptamethylnonane-4-thiol.

8. A process for producing an unsaturated nitrile-conjugated diene copolymer as claimed in claim 6, wherein said copolymerization is effected by an emulsion polymerization procedure using a carboxylic acid type emulsifier as an emulsifier.

9. A process for producing an unsaturated nitrile-conjugated diene copolymer as claimed in any claim 6, wherein a polymerization conversion of at least 75% is employed in the copolymerization.

10. A rubber composition comprising the unsaturated nitrile-conjugated diene copolymer as claimed in claim 1, and 0.01 to 10 parts by weight, per 100 parts by weight of said copolymer, of a sulfur-containing vulcanizer.

11. A rubber composition comprising the unsaturated nitrile-conjugated diene copolymer as claimed in claim 2, and 0.01 to 10 parts by weight, per 100 parts by weight of said copolymer, of a sulfur-containing vulcanizer.

12. A rubber composition comprising the unsaturated nitrile-conjugated diene copolymer as claimed in claim 3, and 0.01 to 10 parts by weight, per 100 parts by weight of said copolymer, of a sulfur-containing vulcanizer.

13. A rubber composition comprising the unsaturated nitrile-conjugated diene copolymer as claimed in claim 4, and 0.01 to 10 parts by weight, per 100 parts by weight of said copolymer, of a sulfur-containing vulcanizer.

14. A rubber composition comprising the unsaturated nitrile-conjugated diene copolymer as claimed in claim 5, and 0.01 to 10 parts by weight, per 100 parts by weight of said copolymer, of a sulfur-containing vulcanizer.

15. In a process for injection molding an unsaturated nitrile-conjugated diene copolymer composition, the improvement comprising using as said composition the rubber composition as claimed in claim 10.

16. An O-ring formed from the rubber composition as claimed in claim 10.

* * * * *

UNITED STATES PATENT AND TRADEMARK OFFICE
CERTIFICATE OF CORRECTION

PATENT NO.:     5,627,250
DATED      :    May 6, 1997
INVENTOR(S):    TSUJI et al.

It is certified that error appears in the above-identified patent and that said Letters Patent is hereby corrected as shown below:

On the title page:

In item [73], the Assignee, "Nippon Zion" should be --Nippon Zeon--.

Signed and Sealed this

Fifth Day of May, 1998

*Attest:*

BRUCE LEHMAN

*Attesting Officer*     Commissioner of Patents and Trademarks